(12) United States Patent
Mann et al.

(10) Patent No.: US 9,313,242 B2
(45) Date of Patent: Apr. 12, 2016

(54) MULTI-RESOLUTION PYRAMID FOR GEOREFERENCED VIDEO

(71) Applicant: Skybox Imaging, Inc., Mountain View, CA (US)

(72) Inventors: Julian M. Mann, Menlo Park, CA (US); M. Dirk Robinson, Menlo Park, CA (US)

(73) Assignee: Skybox Imaging, Inc., Mountain View, CA (US)

( * ) Notice: Subject to any disclaimer, the term of this patent is extended or adjusted under 35 U.S.C. 154(b) by 408 days.

(21) Appl. No.: 13/971,724

(22) Filed: Aug. 20, 2013

(65) Prior Publication Data

US 2014/0059166 A1     Feb. 27, 2014

Related U.S. Application Data

(60) Provisional application No. 61/691,438, filed on Aug. 21, 2012.

(51) Int. Cl.
| | |
|---|---|
| *G06F 15/16* | (2006.01) |
| *H04L 29/06* | (2006.01) |
| *H04N 21/2343* | (2011.01) |
| *H04N 21/4728* | (2011.01) |
| *H04N 21/81* | (2011.01) |

(52) U.S. Cl.
CPC ............ *H04L 65/60* (2013.01); *H04L 65/602* (2013.01); *H04L 65/80* (2013.01); *H04N 21/23439* (2013.01); *H04N 21/234345* (2013.01); *H04N 21/234363* (2013.01); *H04N 21/234381* (2013.01); *H04N 21/4728* (2013.01); *H04N 21/816* (2013.01); *H04N 21/8133* (2013.01)

(58) Field of Classification Search
CPC ... H04L 65/60; H04L 65/602; H04L 21/4728; H04L 21/234381
See application file for complete search history.

(56) References Cited

U.S. PATENT DOCUMENTS

| | | | |
|---|---|---|---|
| 5,175,630 A * | 12/1992 | Tabuchi | H04N 9/81 360/64 |
| 6,262,741 B1 | 7/2001 | Davies | |
| 7,158,878 B2 | 1/2007 | Rasmussen et al. | |
| 7,894,535 B2 * | 2/2011 | Pantalone | H04N 21/234327 375/240.01 |
| 8,121,433 B2 | 2/2012 | Leprince et al. | |

(Continued)

OTHER PUBLICATIONS

International Search Report, Mailed Jun. 20, 2014—5 pages.

(Continued)

*Primary Examiner* — Moustafa M Meky
(74) *Attorney, Agent, or Firm* — Dority & Manning, P.A.

(57) ABSTRACT

Examples of systems and methods for delivering overhead video to a computing device are provided. Delivering the overhead video can include generating multiple versions of the overhead video having respective resolutions, bitrates, or frame rates. The system can then generate georeferenced video data for each version by incorporating georeferencing coordinates and time synchronization information. The georeferenced video data can be stored in transcoded video files. In response to a request from a computing device for video data of a geographical region, the system can transmit a primary video stream comprising georeferenced video data of a relatively high quality and a secondary video stream comprising georeferenced video data of a relatively low quality, wherein the primary video stream includes the geographical region and the secondary video stream includes a proximal geographical region.

23 Claims, 6 Drawing Sheets

(56) References Cited

U.S. PATENT DOCUMENTS

| | | | |
|---|---|---|---|
| 2003/0095181 A1 | 5/2003 | LeCompte | |
| 2004/0213544 A1* | 10/2004 | Legate | H04N 7/025 386/233 |
| 2006/0176951 A1 | 8/2006 | Berman et al. | |
| 2006/0239574 A1 | 10/2006 | Brower et al. | |
| 2010/0020091 A1 | 1/2010 | Rasmussen et al. | |
| 2010/0165112 A1* | 7/2010 | Scanlon | G06K 9/00771 348/169 |
| 2011/0085034 A1 | 4/2011 | McDonald et al. | |
| 2011/0115793 A1 | 5/2011 | Grycewicz | |
| 2011/0169960 A1* | 7/2011 | Wagner | H04N 5/145 348/162 |
| 2012/0254933 A1* | 10/2012 | Lee | H04N 9/8227 725/116 |
| 2014/0040496 A1* | 2/2014 | Moorthy | H04L 65/4084 709/231 |
| 2015/0264331 A1* | 9/2015 | Suh | H04N 13/0059 348/43 |

OTHER PUBLICATIONS

Bing Maps Tile System, http://msdn.microsoft.com/en-us/library/bb259689 (d—printer).aspx, 11 pages.

Feng et al: "Supporting Region-of-Interest Cropping Through Constrained Compression", Proceedings of the 16th ACM International Conference on Multimedia, Vancouver, British Columbia, Canada, Oct. 26-31, 2008, pp. 745-748.

Inoue et al., "Interactive Panoramic Video Streaming System over Restricted Bandwidth Network", Proceedings of the International Conference on Multimedia, MM '10, New York, New York, USA, Oct. 29, 2010, pp. 1191-1194.

Itti, "Automatic Foveation for Video Compression Using a Neurobiological Model of Visual Attention", IEEE Transactions on Image Processing, vol. 13, No. 10, Oct. 2004, pp. 1304-1318.

Khiem et al: "Supporting Zoomable Video Streams with Dynamic Region-of-Interest Cropping", Proceedings of the First Annual ACM SIGMM Conference on Multimedia Systems, Phoenix, Arizona, Feb. 22-23, 2010, pp. 259-270.

Maso et al., "Combining JPEG2000 Compressed Formats and OGC Standards for Fast and Easy Dissemination of Large Satellite Data", Italian Journal of Remote Sensing, vol. 42, No. 3, Sep. 28, 2010, pp. 101-114.

Ravindra et al., "On Tile Assignment for Region-of-Interest Video Streaming in a Wireless LAN", Proceedings of the $22^{nd}$ International Workshop on Network and Operating System Support for Digital Audio and Video, Toronto, Canada, Jun. 7-8, 2012, pp. 59-64.

Skodras et al., "The JPEG 2000 Still Image Compression Standard", IEEE Signal Processing Magazine, vol. 18, No. 5, Sep. 2001, pp. 36-58.

Tanner et al., "The Clipman: A Virtual Mitmap", Processing of the $25^{th}$ Annual Conference on Computer Graphics and Interactive Techniques, Orlando, Florida, Jul. 19-24, 1998, pp. 151-158.

Zanoguera et al., "A Segmentation Pyramid for the Interactive Segmentation of 3-D Images and Video Sequences", Proceedings of the International Symposium of Mathematical Morphology, Palo Alto, California, Jun. 2000, pp. 223-232.

Zhou, "Near Real-Time Orthorectification and Mosaic of Small UAV Video Flow for Time-Critical Event Response", IEEE Transactions on GeoScience and Remote Sensing, vol. 47, No. 3, Mar. 2009, pp. 739-747.

* cited by examiner

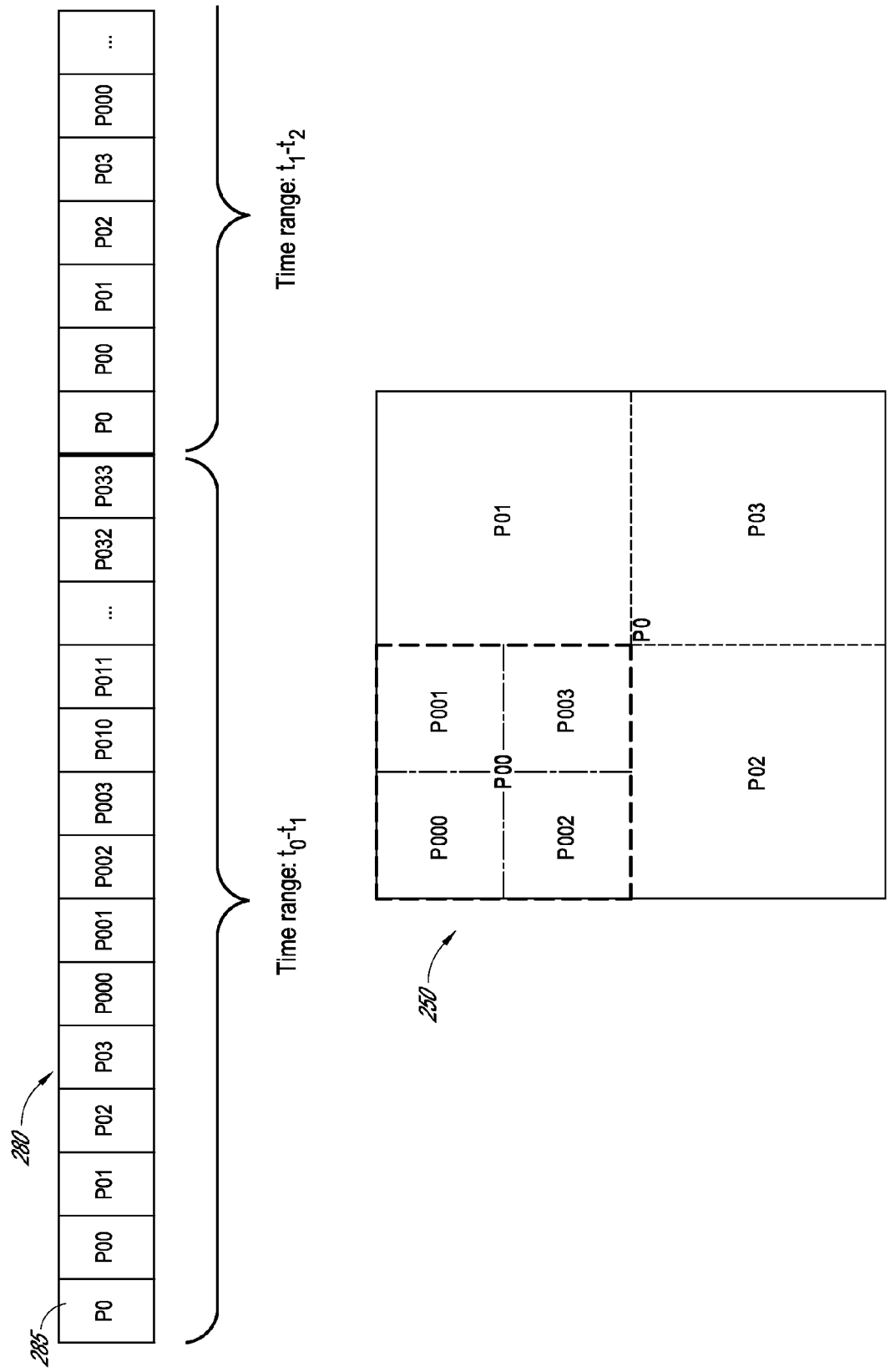

MULTI-RESOLUTION PYRAMID FOR GEOREFERENCED VIDEO

CROSS-REFERENCE TO RELATED APPLICATIONS

This application claims the benefit of priority under 35 U.S.C. §119(e) to U.S. Provisional Patent Application No. 61/691,438, filed Aug. 21, 2012, entitled "Multi-Resolution Pyramid for Georeferenced Video," which is expressly incorporated by reference herein in its entirety so as to form part of this specification.

BACKGROUND

1. Field

The disclosure relates generally to systems and methods for storing and delivering georeferenced video, and more particularly to storing and delivering georeferenced overhead video using relatively low bandwidth communications.

2. Description of Related Art

Overhead video can be utilized in mobile environments characterized by relatively low-bandwidth communication data rates. Mobile devices can be used to view georeferenced overhead video for navigation and/or object tracking purposes. The mobile devices may be limited by relatively low bandwidth, e.g., 20-40 kilobits per second (kbps). High-resolution overhead video represents a relatively large quantity of data that may be desirable to receive and view on a mobile device.

SUMMARY

The systems, methods and devices described herein have innovative aspects, no single one of which is indispensable or solely responsible for their desirable attributes. Without limiting the scope of the claims, some of the advantageous features will now be summarized.

Overhead video can be used to provide time-dependent, location-specific information to users who receive the overhead video utilizing a variety of communications systems with different bandwidths. It may be that a number of these users receive the overhead video over relatively low-bandwidth communications systems, such as through the use of mobile devices or in remote areas with no access to high-bandwidth network systems. Accordingly, the present disclosure advantageously provides for overhead video delivery systems and methods configured to timely deliver requested video of regions of interest to a plurality of users, where the quality of the video of the region of interest delivered to a particular user is increased or maximized based at least in part on the bandwidth of each user.

Furthermore, viewers of the overhead video may want to interact with it to be able to change the location being viewed (e.g., by panning the video), change the resolution or scale of the location being viewed (e.g., by zooming in or out of the video), track an object across a location, or the like. For a satisfying user experience, these changes should occur with little or no latency (e.g., in real-time or near real-time with the request). Typically, to deliver such functionality would require a relatively-high bandwidth communication system and/or a high-powered video server system so that changes to the requested overhead video stream could be delivered shortly in time after the requested change. Accordingly, the present disclosure advantageously provides examples of overhead video delivery systems and methods configured to timely respond to changes in the requested video stream. For example, video data may cover a larger area than is viewed by a user. The present disclosure provides methods of caching proximal or adjacent video streams which allow a video delivery system to provide video data to one or more users where users are allowed to pan, zoom, and/or otherwise interact with the video stream to change a viewing region or viewing parameters with little to no latency. A proximal or adjacent video stream can be video data which is proximal or adjacent in a geographical sense or in a resolution sense, such as in a multi-resolution pyramid segmentation approach provided herein.

Some embodiments of the systems and methodologies presented herein can leverage a pyramid segmentation approach applied to orthorectified video data with additional settings to account for different communication bandwidths of receiving computing systems. The systems and methods can pre-render multiple videos from an orthorectified video source. The multiple rendered videos represent different spatial resolutions, regions of interest ("ROIs"), frame-rates, and/or encoding bitrates. The systems and methods can leverage georeferenced coordinates and time synchronization information of video source data to enable efficient caching strategies.

For example, a video server can be configured to pre-render multiple video files from a single source video such that the rendering is performed one time. This can reduce or minimize latency for users or viewers of the video. Pre-rendering multiple video files can allow multiple users to access disparate videos (e.g., different locations, different ROIs within a location, spatial sub-regions, different resolution videos, video segments with different frame-rates, video streams with differing bandwidth data rates) depending at least in part on their region of interests and bandwidth limitations. Furthermore, multiple users can request disparate ROIs and/or resolutions without the video server performing additional transcoding.

The video server can pre-render orthorectified video data to enable more efficient caching strategies for both the video server and client applications. For example, a client viewing video data at one ROI and resolution typically requests an adjacent ROI or spatial resolution when changing their requested ROI or resolution. This client behavior enables efficient pre-caching of the neighboring ROI video streams to reduce or limit latency for the client. Although certain example implementations are described in terms of a client-server computer architecture, this is intended for illustration only and is not intended to be limiting. Other computer architectures including distributed architectures, peer-to-peer architectures, multi-tier architectures, or networked architectures can be utilized. In other implementations, a standalone system can be used.

The video server can deliver multiple time-synchronized video streams corresponding to video data for a requested ROI and a surrounding area. The video server can receive a request for video data for a ROI, and can deliver that ROI along with video data of adjacent regions. The video data can have georeferenced coordinates and time synchronization information embedded therein. This can allow the video server to retrieve multiple spatially-adjacent video streams and deliver those video streams such that the frames are synchronized in time. As an example of time synchronization, the video server can deliver two video streams to a computing device that are spatially-adjacent or that contain imagery of regions that are near one another, adjacent to one another, or overlapping. The first and second video streams can each contain a plurality of video frames, wherein each video frame or a subset of the plurality of video frames have time synchronization information embedded therein. The time synchronization information can be used by a display system receiving the video streams to display the video frames from the two video streams at appropriate times relative to one another. This can allow the display system to display synchronized video streams having different frame rates. This can allow the display system to display a new video stream that is synchronized in time with other video streams. For example, the display system can display a plurality of video streams as described. In response to panning or zooming, a new video stream can be delivered to the display system. The display system can use the georeferenced coordinates and time synchronization information in the new video stream such that the video frames from the new video stream are displayed in an appropriate location and synchronized in time relative to the other video streams being displayed.

In some embodiments, a system for delivering georeferenced video to a computing device is provided. The system comprises a video server system configured to receive overhead video data from a source such as an overhead imaging platform (e.g., satellite, aerial vehicle, etc.). The video server includes a transcoding module configured to transcode the received overhead video into a multi-scale, pyramidal data format. The transcoding module can incorporate georeferencing coordinates and/or time synchronization information into the transcoded video. The video server includes a caching module configured to respond to requests for video data by retrieving transcoded video data which includes imagery of a requested geographical region, caching video data from proximal geographical regions, caching video data with proximal spatial resolutions, and transmitting a video stream comprising a primary segmented video tiles and a secondary segmented video tile. The primary segmented video tile has a first resolution and/or a first frame rate and the second segmented video tile has a second resolution less than the first resolution and/or a second frame rate less than the first frame rate.

In some embodiments, a logical structure for encapsulating video data is provided. A first field is included in the logical structure which is configured to store video data having a pyramidal resolution. A second field is included to store georeferencing coordinates. A third field is included to include timing synchronization information. The video data can include orthorectified video data.

In some embodiments, a logical encapsulation of the transcoded video data is provided which enables applications to pan and/or zoom a video stream during playback or track an object in a video sequence throughout multiple ROIs. In these cases, a video server caches the logical encapsulation of the video data through comprising a plurality of ROI sub-videos to enable relatively seamless browsing of disparate regions and/or resolutions in the video sequence.

In some embodiments, a stream of transcoded video data comprises collections of multiple video sequences wherein certain portions of the delivered video have higher spatial or temporal resolution or bitrate. In effect, this enables a type of "foveated" video browser where a user may view certain ROIs at relatively high resolution (with correspondingly high bandwidth requirements) while also viewing surrounding regions at lower spatial and/or temporal resolution for context.

In some embodiments, a user interface is provided for viewing georeferenced video data served wherein the video data is encapsulated using logical structures described herein. The user interface can be configured to allow a user to browse georeferenced video data. The user can pan around a video stream to see different geographical regions while receiving the video stream. The user can zoom into or out of a region of interest while receiving the video stream. The user interface can receive foveated video to facilitate presenting video data covering a relatively large geographical area and/or to present video data over a relatively low bandwidth network connection. The user interface can track an object through the video stream and provide streaming video that includes the object as it leaves a first video region and enters a second video region.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

FIG. 2B illustrates an example of a file structure representing a video stream, wherein the video stream can be representative of an image scene.

FIG. 3A illustrates an example video frame with a first segmentation.

FIG. 3B illustrates an example video frame with a second segmentation.

DETAILED DESCRIPTION

Figure 1:
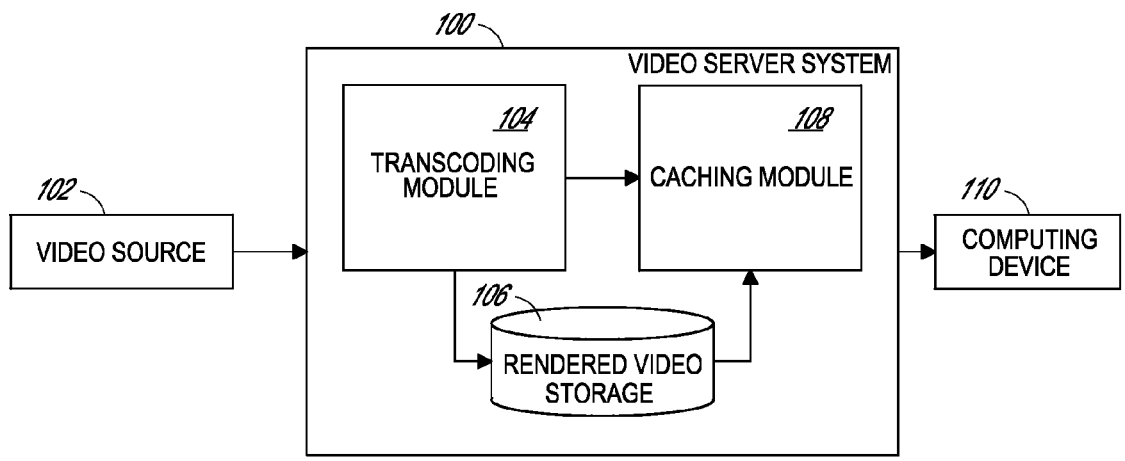
FIG. 1 illustrates an example embodiment of a video server system for delivering georeferenced video to a computing device.

Described herein are systems and related methodologies for receiving, transcoding, storing, and delivering georeferenced overhead video to one or more computing devices. The overhead video may be orthorectified. It will be understood that although many of the examples in the description herein are in the context of orthorectified overhead video, one or more features of the present disclosure can also be implemented in systems configured to deliver any type of georeferenced or location-referenced video including video that has not been orthorectified and/or video that is not overhead video. Georeferenced video includes video that has a location associated with it based on an Earth-referenced system (e.g., latitude and longitude) or other Earth-based coordinate system. Location-referenced video includes video that has a location associated with it through the use of any appropriate coordinate system. The location can be associated with the video through the use of a variety of means including, without limitation, data incorporated into the video file, data stored in a database, filename conventions, video acquisition data, and the like.

Overhead video is a broad term and is to be given its ordinary and customary meaning to a person of ordinary skill the in the art (e.g., it is not to be limited to a special or customized meaning) and includes, without limitation, a series of satellite images captured by satellites in earth-orbit, aerial photographs and video, overhead image data captured by aircraft (e.g., airplanes, helicopters, drones, unmanned aerial vehicles (UAV), balloons, etc.), surveying of a geographic region, and the like. Overhead video can be acquired by a variety of image collection platforms such as, for example, satellite imaging systems, aerial imaging systems, unmanned aerial vehicles (UAVs), and the like. Overhead video can include video as well as still images. It is to be understood that overhead imagery may also be used to refer to overhead video.

Orthorectification is a broad term and is to be given its ordinary and customary meaning to a person of ordinary skill the in the art (e.g., it is not to be limited to a special or customized meaning) and includes, without limitation, image processing methods that correct or adjust distortions of overhead imagery (e.g., caused by lens distortions, camera tilt, topographic relief, etc.), geometrical correction of overhead imagery such that scale is uniform, or the like. Raw image data collected by an image sensor on an overhead imagery collection platform can include distortions caused by topographic features (e.g., elevation changes due to terrain, presence of buildings, structures, etc.) on the surface being imaged, and/or distortions caused by the acquisition system (e.g., camera tilt, lens distortions, etc.). For example, the raw data can include terrain distortions when the image sensor is not pointing directly downward toward the nadir location below the sensor. Image processing modules and systems can include orthorectification procedures and algorithms to remove such distortions. For example, a digital elevation model can be used to geometrically remove topographic distortions in the raw image data to produce an orthorectified image.

Example Video Server System

FIG. 1 illustrates an example embodiment of a video server system 100 (sometimes also referred to as a video delivery system) for delivering orthorectified video to a computing device 110. The video server system 100 can be configured to receive video data from a video source, transcode the received video data, store the transcoded video data, and cache video streams for delivery to a computing device 110. The video server system 100 can be configured to transcode video data using a pyramid segmentation approach (described in greater detail herein with reference to FIGS. 3A, 3B, and 5), such that the video data is transcoded using multiple image resolutions. The video server system 100 can be configured to store georeferencing coordinates with the transcoded video stream for purposes of delivery to the computing device 110. The video server system 100 can be configured to store time synchronization information with the transcoded video data to aid in delivering time-synchronized video and/or in stitching video streams upon delivery to the computing device 110. The computing device 110 can include any type of computing device, for example, a desktop or mainframe computer, a server, a laptop, a tablet, a mobile telephone, an electronic book reader, etc. The video server system 100 can include computing hardware such as one or more physical processors, non-transitory memory, communications buses, controllers, communications interfaces, and the like. The video server system 100 can use a controller, for example, to coordinate and control the operation of the various components and modules that make up the video server system 100 to receive, store, transcode, and/or deliver overhead video. The video server system 100 is intended to illustrate various features of the present disclosure. In other implementations, the functionalities of the system 100 can be implemented differently such as, for example, merging or combining functionalities of different components, separating the functionalities into additional and/or different components, adding or deleting functionalities, and so forth.

The video delivery system 100 receives video data from video source 102. The video source 102 can be any source of video data. The video source can be, for example, an imaging satellite, an aerial imaging system, an unmanned aerial vehicle, or other video server system which received video data from one of the above-identified video sources. The video data can be orthorectified overhead video data or the video server system 100 can be configured to process overhead video data to create orthorectified overhead imaging data using georeferencing model information. The video data can be panoramic video data or other non-overhead imagery. The video data can have a variety properties including, for example and without limitation, RAW or compressed video data, global positioning system (GPS) data, timing information, acquisition-related metadata, other metadata, and the like. The video data can be delivered using wireless communication, wired communication, or a combination of these. The video data can be directly communicated to the video server, delivered through peer-to-peer methods, or received by way of distributed computing devices. The video data can be requested by the video delivery system 100, automatically sent to the video delivery system 100, received via a file synchronization service, offered and/or purchased from a third party system, and the like.

The video data can be acquired using any of a variety of video collection platforms, some of which may deliver high-resolution orthorectified video data. These video collection platforms may collect high-resolution motion imagery over a large geographical area, representing a relatively large quantity of image data. The video source 102 can be one of these video collection platforms or any of a number of intermediaries which receive the video data from one of these platforms. One example of the video source 102 is the system described herein with reference to FIG. 6, which illustrates a constellation of imaging satellites configured to acquire overhead video and deliver it to systems on the ground via a communication system. For example, the video data could be received from one (or more) of the imaging satellites 12.

With continued reference to FIG. 1, the video delivery system 100 includes a transcoding module 104 configured to process the received video data to prepare it for storage, caching, and delivery. The transcoding module 104 can be configured to perform pre-processing on the received video data; incorporate location and/or time information into the video data; and generate multiple video files or video streams having different levels of resolutions, frame rates, bit rates, and the like. The transcoding module 104 can be configured to generate one or more video files where each of the one or more video files encapsulates video data having a unique resolution, bitrate, and/or frame rate. The transcoding module 104 can also be configured to generate one or more video files where each of the one or more video files encapsulates video data having a plurality of resolutions, bitrates, and/or frame rates.

The transcoding module 104 can be configured to pre-process the received video data. Pre-processing can include, for example and without limitation, video compression, orthorectification, distortion correction, normalization, or the like. Pre-processing the received video data can include stitching video data where the video data is adjacent or overlaps. For example, the video data may be received from a plurality of video sources covering overlapping geographical regions. The video data can be used to generate one or more composite video streams which cover a geographical area. Pre-processing can include generating video data which is static relative to a target such as when the video is acquired from a moving platform. Pre-processing can include object identification and/or object tracking.

The transcoding module 104 can transcode the received video data a single time to create the one or more video files. Transcoding can include, for example, compressing RAW video data, converting the video data from one compression scheme to another, cropping video data, generating video data which has a different resolution from the source, generating video data which has a different frame rate from the source, generating video data which has a different bitrate from the source, encapsulating the source video data into a file or wrapper format, or any combination of these.

Figures 3A, 3B:
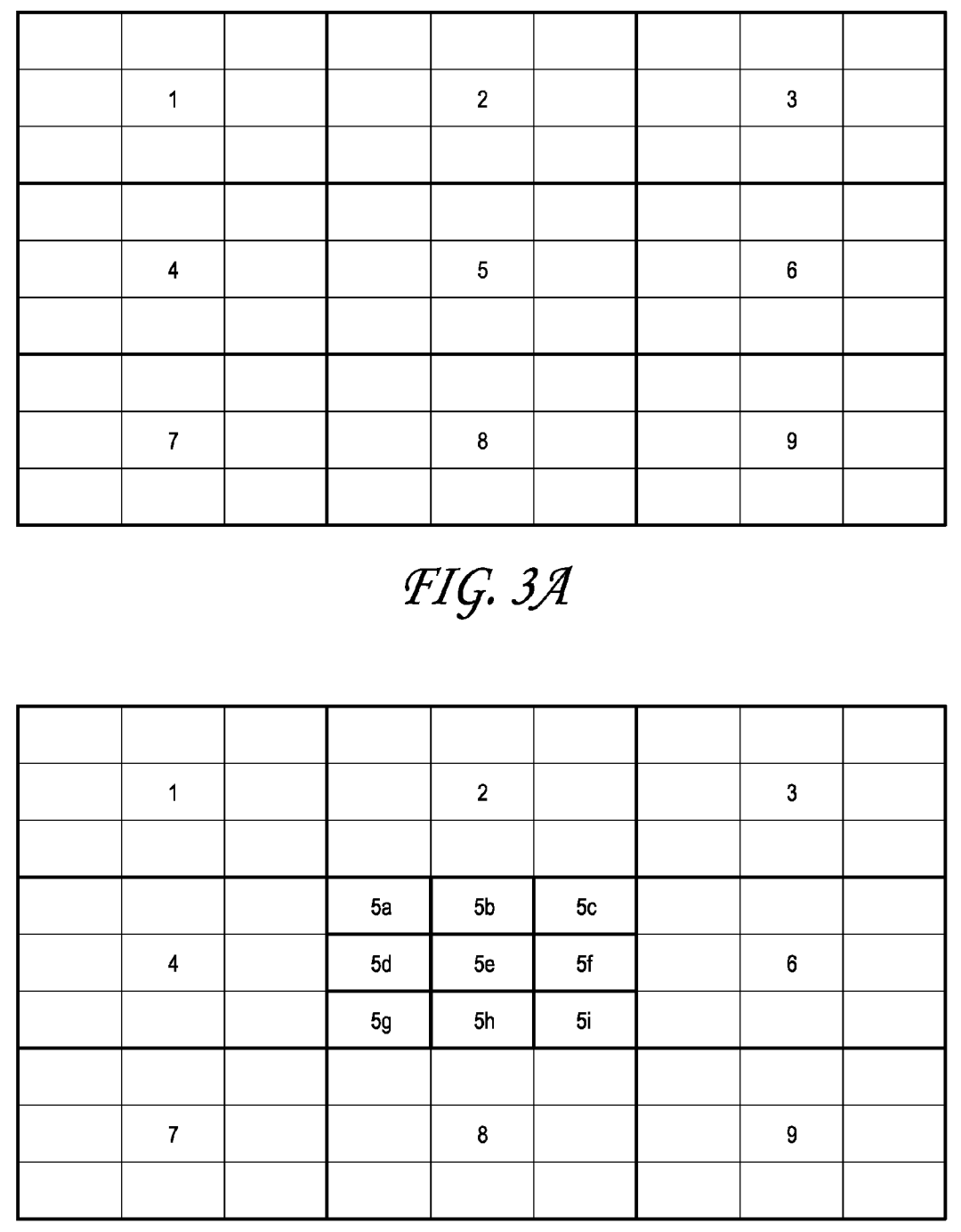
Figure 6:
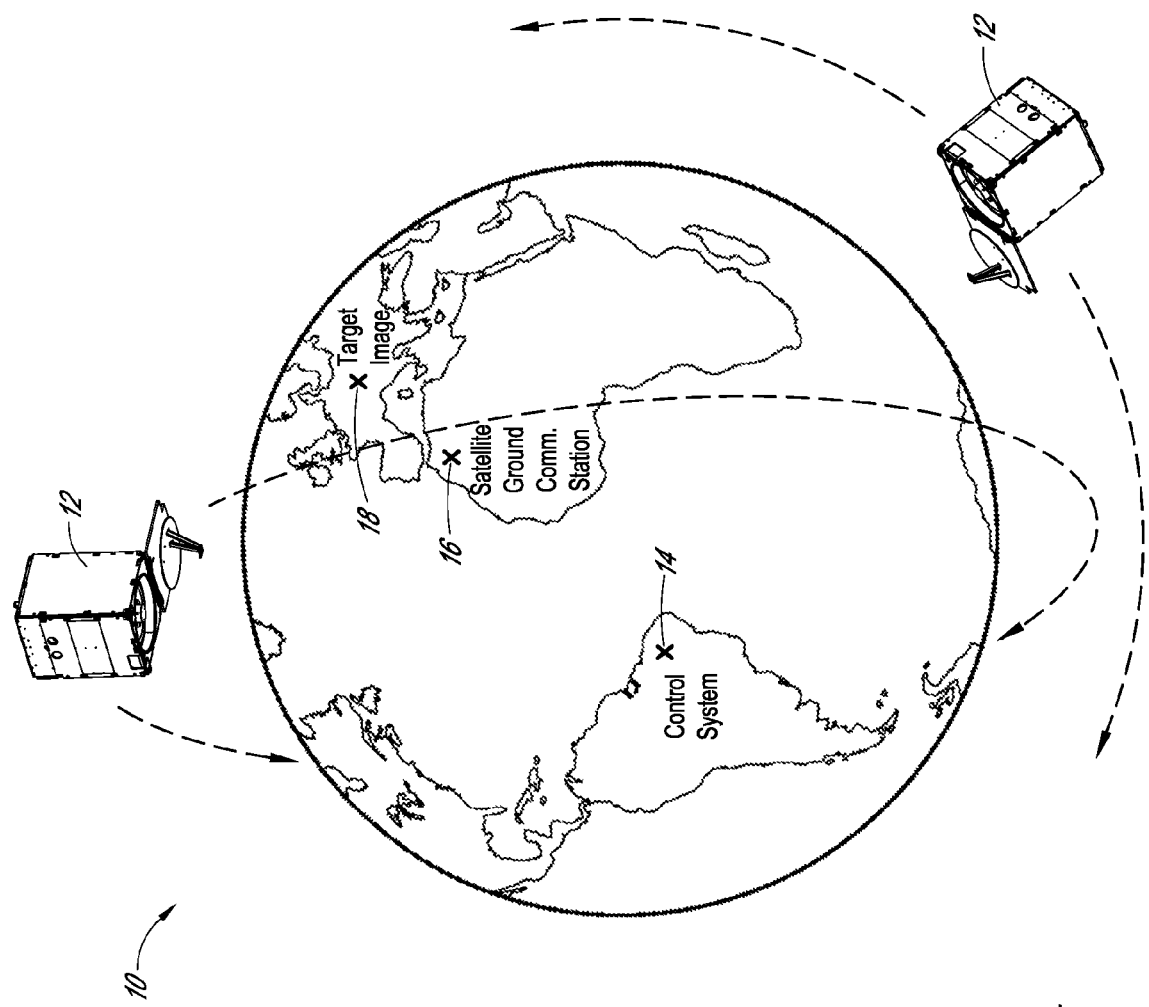
FIG. 6 illustrates an example satellite imaging system having a constellation of imaging satellites, a control center, and a ground communication station.

During the transcoding process, the transcoding module 104 can create video streams having a multi-resolution pyramid segmentation structure, which is described in greater detail herein with reference to FIGS. 3A, 3B, and 6. The transcoding module 104 can create a first video stream by transcoding entire frames of the source video at a defined resolution (e.g., the resolution of the source, a resolution greater than the source, or a resolution smaller than the source). As used here, the source video can be the video data received directly from the video source 102 or it can be the video data resulting from pre-processing performed by the transcoding module 104. The transcoding module 104 can create a second video stream by dividing entire frames of the received video into tiles, and transcoding the segmented tiles at the defined resolution. The transcoding module 104 can create a third video stream by dividing the segmented tiles from the second video stream into smaller segments and transcoding each smaller segment at the defined resolution. In this way, the transcoding module 104 can construct a resolution pyramid for the video data. At each level of the pyramid, a single video stream has the defined resolution. As a result, each successive level of the pyramid contains video streams with a greater number of pixels per area imaged (e.g., more pixels per square foot) than the preceding level.

The transcoding module 104 also can create video streams having a pyramid structure based at least in part on bitrate. For example, a first video stream can be generated by transcoding the source video using a first bitrate, a second video stream can be generated by transcoding the source video using a second bitrate that is greater than the first bitrate, a third video stream can be generated by transcoding the source video using a third bitrate that is greater than the second bitrate, and so on.

Similarly, the transcoding module 104 also can create video streams having a pyramid structure based at least in part on frame rate. For example, a first video stream can be generated by transcoding the source video using a first frame rate, a second video stream can be generated by transcoding the source video using a second frame rate that is greater than the first frame rate, a third video stream can be generated by transcoding the source video using a third frame rate that is greater than the second frame rate, and so on. In some implementations, the frame rate of a video stream can be adjusted by dropping and/or repeating video frames during delivery or transmission in addition to or rather than generating video streams with a variety of frame rates.

The transcoding module 104 can create a pyramid structure of video streams through recursive segmentation of the source video. For example, a first-level video stream can be generated by transcoding the source video at a first resolution which corresponds to a number of pixels per area. The first resolution can be, for example, the native resolution of the source video, a resolution that is greater than the native resolution of the source video, or a resolution that is less than the native resolution of the source video. A plurality of second-level video streams can be generated by segmenting the first-level video stream into a number of video tiles. Each of the second-level video streams (or tiles) can have a resolution that maintains the number of pixels per area. For example, if the first-level video stream is divided into 4 tiles, then each second-level video tile can have one-fourth of the number of pixels of the first-level video stream. For each of the second-level video streams, a plurality of third-level video streams can be generated by segmenting the corresponding second-level video stream into a number of tiles. Each of the third-level video streams can have a resolution that maintains the number of pixels per area. This process can continue for any number of desired or suitable pyramid levels. One example of this segmentation approach is described with reference to FIGS. 3A and 3B. The number of tiles per level can be different for each level. For example, each tile in a first level can be segmented into 4 tiles to create a second level, but each tile in the second level may be segmented 6 times to create a third level. For each tile in a particular level, the number of segmentations made to generate the successive level can be different. For example, if there are 4 tiles in the second level, the first second-level tile can be segmented 4 times, the second second-level tile can be segmented 6 times, the third second-level tile can be segmented twice, and the fourth second-level tile can be segmented 9 times, thereby creating 21 tiles in the third level.

The transcoding module 104 can combine these pyramid structures in any permutation. For example, after generating the resolution-based pyramid segmentation structure, each segmented video tile can be used as the source video to generate video streams using the bitrate-based pyramid structure, the frame rate-based pyramid structure, the segmentation-based pyramid structure, or any combination of these. Any particular combination of pyramid structures can be used with an aim to increase or optimize bandwidth utilization without exceeding data rate limits of the recipient computing device 110. For example, a multi-resolution pyramid segmentation video structure can be generated such that a primary video stream is delivered to the computing device 110, the primary video stream including imagery of a region of interest, and a plurality of secondary video streams is delivered to the computing device 110, each of the secondary video streams being adjacent or proximal to the region of interest. The primary video stream can have at least one of a resolution, bitrate, and/or frame rate that exceeds that same parameter for each of the secondary video streams. As used herein, two video streams are proximal in a geographical sense when the video contains overlapping image data (e.g., one location is imaged in both video streams), the video contains image data of locations where the closest edges of the video streams are within less than 100 pixels of one another, less than 50 pixels, less than 10 pixels, or less than 5 pixels. As used herein, two video streams are adjacent if at least one edge of the video stream is substantially parallel to a corresponding edge in the adjacent video stream (e.g., their relative angular deviation is less than 5°, less than 1°, or less than) 0.5° and the edges are separated by a pixel-based distance that is less than 50 pixels, less than 10 pixels, or less than 5 pixels. As used herein, when two video streams are proximal on a pyramid structure (e.g., a multi-resolution segmentation pyramid of video data) it can mean that the video streams are separated by three or fewer levels or two or fewer levels. When two video streams are adjacent in a pyramid structure, it can mean that they are separated by only one level.

The transcoding module 104 can incorporate georeferencing coordinates into the one or more video files. Incorporating coordinates into the files can include, for example and without limitation, generating a file structure or logical encapsulation which includes the coordinates along with the video data, saving the coordinates in a database that references the video file, saving the coordinates as metadata for the video file, generating a companion file that has the coordinates with the video file (e.g., an extended markup language (XML) file), or the like. Using the incorporated georeferencing coordinates, a request for a video stream can be fulfilled by identifying the one or more video files containing video data for the appropriate georeferenced region. The georeferencing coordinates can be derived from information received from the video source 102, information embedded in the source video, information derived during pre-processing, user input, approximations, or any combination of these. The georeferencing coordinates can be used to generate appropriate pyramid segmentations by providing alignment and/or location information. As described elsewhere herein, other coordinate systems can be used instead of or in addition to georeferencing coordinates.

The transcoding module 104 can incorporate time synchronization information into the one or more video files. Time synchronization information can include, for example and without limitation, times of key frames in a video stream or video file, an absolute time associated with key frames or with each frame in the video file, a time difference between successive frames, a relative time from a start time, or the like. Using the time synchronization information, tiles in segmented frames can be displayed at disparate frame rates while maintaining each tile in the video stream synchronized. In addition, the time synchronization information incorporated with the video data can allow the video server system 100 to add and drop segmented tiles from the video stream without losing overall video synchronization. As described herein, this can advantageously allow the video server system 100 to deliver video data having tiles with differing resolutions, bitrates, and/or frame rates to accommodate transport over network connections having a relatively low bandwidth while maintaining a relatively high or optimized video quality for a region of interest.

With continued reference to FIG. 1, the video server system 100 can include a rendered video storage 106. The rendered video storage 106 can store the rendered video transcoded by the transcoding module 104. The rendered video storage 106 can include any non-transitory data storage component, device, or system. By storing each of the rendered videos generated by the transcoding module 104, requests for video data can generally be satisfied without performing additional transcoding processes. This can speed up video delivery because requested video streams can be delivered as they are retrieved from storage rather than after a potentially lengthy transcoding process.

The rendered video storage 106 can include information about the stored video, such as video streams that are geographically or logically connected, which can be stored with the video files and/or in a database. The rendered video storage 106 can generate a database which contains relationships between video streams. For example, for a given video stream, information can be stored in the rendered video storage 106 about which video files contain proximal video data, where proximal video data includes proximity in a geographical sense, in a frame rate sense, in a resolution sense, bitrate, in a chronological sense, and the like. For example, a first video file can contain video data of a first region and a second, proximal video file can contain video data about a neighboring region, where the distance between the neighboring regions, measured in pixels, is less than or equal to 20% of the resolution of the video data, less than or equal to 10% of the resolution of the video data, less than or equal to 5% of the resolution of the video data, or less than or equal to 1% of the resolution of the video data. The rendered video storage 106 can store and deliver this information to the caching module 108 to enable efficient and effective caching strategies. Furthermore, the rendered video storage 106 can store and deliver information related to timing of the video files to enable the display of chronologically proximal video streams.

Two video streams can be proximal in a frame rate sense if the frame rates are within a multiple of 2 of one another, within a multiple of 1.5 of one another, or within a multiple of 1.25 of one another. Two video streams can be proximal in a resolution sense of the resolutions are within a multiple of 3 of one another, within a multiple of 2 of one another, within a multiple of 1.5 of one another, or within a multiple of 1.25 of one another. Two video streams can be proximal to one another in bitrate of the bitrates differ by less than 50%, less than 25%, or less than 10%. Similarly, proximity can be based on the values used in the pyramid data structure. For example, if a first level of the period contains video data having a first resolution and a second level of the pyramid contains video data having a second resolution, then a video stream from the first level is proximal to a video stream in the second level regardless of the relative values of the resolutions. This is also applicable for frame rate, bitrate, and other video properties.

With continued reference to FIG. 1, the video server system includes caching module 108 configured to retrieve video data from the rendered video storage 106 and to create one or more video streams. The video streams can be created based at least in part on user input or requests from the computing device 110. The caching module 108 can receive or determine information about a bandwidth of an intended recipient computing device and retrieve video data that satisfies the request for video and that can be transmitted over the communications link (e.g., the transmitted data rate is less than or equal to the bandwidth or less than or equal to a fraction of the bandwidth where the fraction is 90%, 80%, 70%, 60%, 50%, etc.).

The caching module 108 can use the multi-resolution segmented pyramid video data created by the transcoding module 104 to deliver video data comprising multiple video streams of differing characteristics such as, for example, resolution, bitrate, frame rate, or the like. For example, a request can be made for video data of a region of interest. The caching module 108 can retrieve an appropriate video file that contains the region of interest from the rendered video storage 106 based at least in part on georeferencing coordinates incorporated into the video or stored in a database. The caching module 108 can determine whether a segmented tile within the video data contains the entire region of interest. If it does, the caching module 108 can determine increased, maximized, or optimized quality parameters (e.g., resolution, bitrate, frame rate, video codec, audio, etc.) for delivering that segmented tile while delivering surrounding tiles having decreased or minimized quality parameters. In that way, the caching module 108 can deliver video data of the region of interest where the video stream containing the region of interest is of a higher quality (e.g., higher resolution, higher bitrate, higher frame rate, etc.) than the surrounding video streams. In some embodiments, the video stream delivered with the higher quality parameters is referred to as the primary video stream and the other video streams are referred to as the secondary video streams. The caching module 108 can be configured to deliver one or more primary video streams, depending at least in part on the requested region of interest, object to be tracked, user input, or the like. The caching module 108 can be configured to retrieve video data that is proximal or adjacent to the primary video stream(s) to deliver as secondary video streams. Proximal or adjacent video data is video data that contains imagery that overlaps with other video data, that abuts other video data, or that is within a threshold distance from the neighboring video data as measured in pixels. Proximal video data includes video data that is separated by less than or equal to a fraction of the number of horizontal or vertical pixels in the video stream (e.g., for a video stream with 1920×1080 pixels, the separation can be measured as a fraction of either 1920 pixels or 1080 pixels), where the fraction can be 0.2, 0.1, 0.05, or 0.01.

In some embodiments, the quality of the video streams can be determined based on threshold quality values. A minimum secondary video stream quality threshold can be set such that each secondary video stream is required to have a quality parameter that is at least the threshold value. For example, the quality threshold can be based at least in part on the frame rate. The secondary video streams, then, can be selected such that each has a frame rate that is greater than or equal to the minimum frame rate threshold. The caching module 108 can determine a data rate for all the secondary video streams being delivered with the minimum quality values. The caching module 108 can then determine a maximum quality of the primary video stream(s) up to the maximum quality threshold. The limitation is that the total data rate (e.g., the data rate of delivering all of the primary and secondary video streams) does not exceed the bandwidth limitations, as described herein. If the primary video stream(s) can be delivered with a maximum quality (e.g., the quality parameters are equal to the maximum quality threshold), then the caching module 108 can increase the quality of the secondary video streams. Again, the quality of the secondary video streams can be increased to a point where the total data rate to be delivered does not exceed the bandwidth limitations.

The caching module 108 can also retrieve video data for regions that are not requested but which are synchronized in time and/or proximal to the requested region in a geographical sense or proximal in a sense of the multi-resolution segmentation pyramid video structure. In that way, if the computing device 110 pans the video one way or another, or selects a new region of interest, the caching module 108 can incorporate the appropriate new video tiles into the delivered video stream synchronized in time with little or no latency. For example, if a user selects a new region of interest, the caching module 108 would have already cached the segmented video tiles with appropriate quality parameters (e.g., resolution, frame rate, or bitrate) so that it could change the primary and secondary video streams with little or no latency, where little or no latency means that the new video stream is delivered with less than or equal to a 10-second delay, less than or equal to a 5-second delay, less than or equal to a 1-second delay, or less than or equal to 0.5-second delay. As described, the caching module 108 can enable spatial and/or resolution browsing of the requested video stream by the computing device 110.

The caching module 108 may also account for zooming in and/or out of a video. For example, the caching module 108 may provide for pre-caching of adjacent zoom levels on the multi-resolution pyramid. The caching module 108 can retrieve video data synchronized in time with the video data being delivered where the cached video data has a higher or lower spatial resolution for a geographic region covered by the video data. The caching module 108 can store this information, load the retrieved video data in a buffer for delivery when requested, or deliver to a display system which can display the identified video having a different resolution when requested. This can enable resolution browsing of video data with little or no latency.

The video delivery system 100 is configured to accommodate multiple users and/or computing devices 110 which are interested in viewing video data of a variety of geographical regions. The computing devices 110 may have relatively low-bandwidth network connections (e.g., less than about 512 kbps, less than about 256 kbps, less than about 128 kbps, less than about 100 kbps, less than about 75 kbps, or less than about 40 kbps, where about can mean ±10%, ±5%, or ±1%) posing difficulty in receiving high-resolution video data. By implementing the transcoding module 104, the rendered video storage 106, and the caching module 108, the video delivery system 100 can deliver high-quality video data of each requested ROI over the relatively low-bandwidth connections. The video delivery system 100 is also configured to provide the video data close in time to its acquisition by the video collection platform (e.g., within 1 day of acquisition, within 12 hours of acquisition, within 4 hours of acquisition, within 1 hour of acquisition, or within 20 minutes of acquisition). The video delivery system 100 is also configured to respond to requests for relatively small ROIs of the overhead imagery through the multi-resolution segmentation pyramidal approach.

The video delivery system 100 is configured to deliver high-resolution video data utilizing a pyramid resolution segmentation of the video data. In some implementations of a pyramid resolution segmentation of the data, a hierarchical set of video tiles is developed. Each video tile can comprise the same number of pixels and the spatial resolution of each pixel can increase with each successive pyramid. This approach can deliver video data to a user using a substantially constant bandwidth regardless of the spatial resolution being delivered to the user for viewing (e.g., where substantially constant bandwidth can mean the bandwidth does not vary by more than 20%, by more than 10%, or more than 5%). Thus, some embodiments provide for a computing device 110 to view a requested ROI by downloading only those pre-rendered images in the ROI and spatial resolution. In some implementation, the video delivery system 100 also delivers video data of surrounding geographical areas at a lower quality to provide context for the relatively high-quality video data of the requested ROI.

Example Video Data File

Figure 2A:
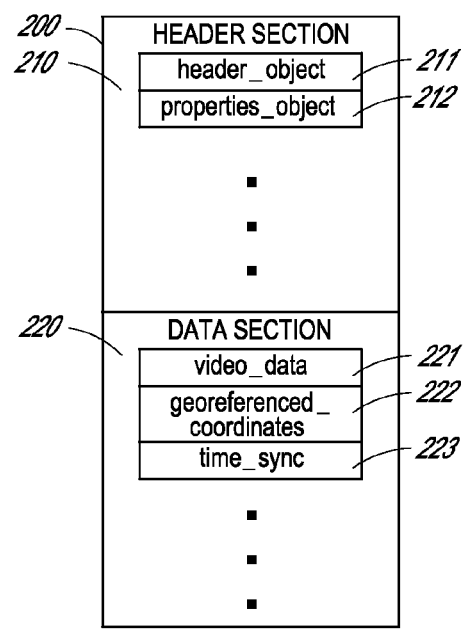
FIG. 2A illustrates a block diagram of components of an example of a georeferenced video stream.

FIG. 2A illustrates a block diagram of components of an example of an orthorectified video stream 200. The video stream 200 can be compatible with standard video encoding and delivery formats such as, e.g., the H.264/MPEG-4 Part 10 ("H.264") advanced video coding standard. The video stream 200 is divisible into a header section 210 and a data section 220. In general, the header section is first transmitted from the video delivery system 100 to the computing device 110 so that the computing device may process the information within the header section. Subsequently, the data section 220 is transmitted from the video delivery system 100 to the computing device 110 on a packet-by-packet basis. The file structure of the video stream 200 can be configured to provide information used by the video delivery system 100 to deliver appropriate video data utilizing the transcoding, storage, and caching algorithms and strategies described herein.

An example of this file structure is illustrated in FIG. 2A. The header section 210 includes a number of objects that describe the video stream 200 in aggregate. The header section 210 includes a header_object 211 that identifies the beginning of the video stream header 210 and specifies the number of objects contained within the header section.

The header_object 211 is followed in the header section 210 by a properties_object 212. The properties_object 212 describes properties about the video stream 200. For example, the properties_object 212 can include information such as a universally unique identifier (UUID), a size of the properties_object 212 field, a UUID for a multimedia stream, a size of the multimedia stream, a creation date, a size or number of packets in the data section 220, a duration of the multimedia stream, packet size information, bit rate information, information related to encryption, information related to error correction, and the like. In some embodiments, the properties_object 212 can be used to determine playback properties of the video stream 200 and/or whether the video stream 200 can be displayed on a system receiving the video stream 200. The header section 210 can include information such as a title, author, copyright information, description, coordinates, date and time, or the like. This information can be included in the properties_object 212 or in other objects in the header section 210.

The data section 220 includes a video_data object 221. The video_data object 221 can be used to mark a beginning of the data section 220 and correlate the header section 210 with the data section 220. The video_data object 221 can include packets which hold the video data payloads for the video stream 200. The video_data object 221 can include the UUID for the video stream, which can contain the same information as the properties_object 212. The video_data object 221 can include a number of packets to be delivered, size of packets to be delivered, information about a structure of packets, packet error correction information, indexing information, timing information, and the like.

The video_data object 221 is followed in the data section 220 by a georeferenced_coordinates object 222. The georeferenced_coordinates object 222 can include information about a geographic mapping of a video frame or video stream 200. For example, georeferenced_coordinates object 222 can include information identifying a location, size, and/or polygon that defines a geographic area which the video frame or video stream 200 covers. The georeferenced_coordinates object 222 can be used by a system to identify adjacent video streams, to decide how and where to display video streams relative to one another, to decide how and where to display video streams on a map or other underlying graphics, and to decide which streams to pre-cache. The georeferenced_coordinates object 222 can include information based at least in part on an Earth-based coordinate system (e.g., latitude and longitude, GPS data, etc.) In some embodiments, the georeferenced_coordinates object 222 is replaced by a location_coordinates object 222, which contains location information based at least in part on a reference to a coordinate system that may not be referenced to an Earth-based system. The location information can be absolute or relative. In some embodiments, both a georeferenced_coordinates object 222 and a location_coordinates object can be present in the file structure.

The data section 220 includes a time_sync object 223. The time_sync object 223 can contain information about an absolute or relative time of frames in the video stream 200. For example, the time_sync object 223 can contain a time at which each frame or a subset of frames in the video stream 200 were acquired. In some embodiments, the time is an absolute time relative to a known or proprietary standard, such as a UTC time, a time acquired from a GPS system, or a time received from the acquiring system such as an imaging satellite or other overhead imaging platform. In some embodiments, the time is a relative time such as an elapsed time from a beginning of acquisition where, for example, a first frame in the video stream 200 would have a relative time of 0. In some embodiments, the time for a frame is a relative time from a key frame, where the time of the key frame is an absolute time. The time_sync object 223 can be used by a system to decide which video streams to retrieve in response to a request for video data, to decide how and when to display video frames in a video stream 200, to synchronize video frames from multiple video streams, and the like.

FIG. 2B shows an example of a file structure representing a video stream 200, wherein the video stream 200 can include a plurality of video frames representative of a scene 250. In the example file structure, the scene 250 can be segmented into three pyramid resolution segmentations, where each successive level of the pyramid covers the scene 250 with more tiles. The tiles in the pyramid can include georeferenced coordinates (e.g., latitude and longitude or GPS data) to define or indicate an area covered by the tile. For example, a first level in the pyramid comprises tile P0 which represents the entire scene 250 at a first spatial resolution or having a number of pixels. In a second level in the pyramid, tile P0 can be divided into tiles P00, P01, P02, and P03, where each tile represents approximately one-fourth of the scene 250 and where each tile has the same number of pixels as P0. Together, tiles P00, P01, P02, and P03 represent the entire scene 250 where the combined representation has four times the spatial resolution or four times the number of pixels compared to tile P0. In a third level in the pyramid, each tile in the second level can be divided into four tiles. For example, tile P00 can be divided into P000, P001, P002, and P003 where each tile in the third level has the same number of pixels as tile P0. The sixteen tiles in the third level of the pyramid represent the entire scene 250 and the resulting representation has sixteen times the spatial resolution or sixteen times the number of pixels compared to tile P0.

In the example file structure representing the video stream 200, each of the tiles 285 within a particular time range (e.g., $t_0$ to $t_1$) can be located together in one data block 280. Tiles within a subsequent time range (e.g., $t_1$ to $t_2$) can be located together in a subsequent block. Formatted in this way, the video stream 200 can increase a speed of random spatial and resolution access due in part to data locality of spatial and resolution portions of the video stream 200.

The example file structure can have a plurality of data blocks in the video stream 200. Each data block can include information related to a geographical area covered, spatial resolution of tiles in the data block, a time range, and/or frame rates. A header in the video stream 200 can include information related to the data blocks, including, for example, a description of different spatial locations, resolutions, and temporal indices in the data blocks. Based at least in part on received requests, the video server 100 can identify and/or deliver the data blocks with the determined resolution, bitrate, frame rate, and location, thereby increasing efficiency of delivering the video stream 200.

In some embodiments, the video stream 200 includes a plurality of segmented video tiles, where each tile can have a different quality parameter. The plurality of segmented video tiles can include geographical proximal video data, as well as video data covering the same region but with different quality parameters. As described herein, the video stream 200 can be configured to deliver these differing video tiles to enable spatial and resolution browsing of the video data. In some embodiments, the video stream 200 is cached at the video server system 100 in one form, and delivered to the computing device 110 with less data than is cached. This may be utilized where the ability of the computing device 110 to cache data is limited, so it would be more efficient to cache the video data on the video server system 100.

Example Video Stream

FIG. 3A illustrates an example video frame with a first segmentation. The video frame can be part of a video stream. The video frame can be divided into multiple tiles. As illustrated, the video frame in FIG. 3A is divided into nine tiles numbered 1-9. The video frame can be divided into any number of tiles as appropriate. The tiles do not have to be uniform in size. The video delivery system 100 can deliver a requested video stream to a computing device 110 by sending video frames stitched together to form a video stream. For example, the video delivery system 100 can send the 9 tiles illustrated in FIG. 3A to a user where each tile can have a different resolution, bitrate, frame rate, or the like.

FIG. 3B illustrates an example video frame with a second segmentation. The video frame depicted in FIG. 3B has been further segmented into secondary tiles in tile 5. The secondary tiles in tile 5 are numbered 5a through 5i. The video delivery system 100 can deliver a requested video to a computing device 110 by sending video frames comprising tiles 1-4, 6-9, and 5a-5i. The delivered video stream can thus comprise tiles of differing resolution, bitrate, frame rate, or the like.

The pyramid segmentation described can be incorporated into the segmentation of the video frames as illustrated in FIGS. 3A and 3B. For example, the tiles 1-4, 6-9 and 5a-5i can comprise tiles of different sizes but having the same number of pixels. In this way, if the computing device 110 zooms into the video stream, the data rate remains substantially constant compared to the unzoomed video stream (e.g., where substantially constant means the data rate does not change by more than 20%, more than 10%, or more than 5%).

Furthermore, the video delivery system 100 can use the caching module 108 to retrieve tiles proximal to tiles in the delivered video stream. For example, if the computing device requests a video stream corresponding to tiles 5a through 5i, the caching module 108 of the video delivery system 100 can retrieve tiles 1-4 and 6-9 and/or any segmentation of those tiles. Thus, if the computing device 110 pans the video stream in a direction, the video delivery system 100 can respond by providing the corresponding video data with little or no latency in the delivery. In addition, if the computing device 110 zooms out, the video delivery system 100 can add tiles 1-4, and 6-9 to the video stream and switch tiles 5a through 5i to tile 5 in the video stream to provide a zoomed out video stream with little or no latency.

Example Method of Caching Video Streams

The following example demonstrates some advantages of delivering georeferenced overhead video according to some systems and methods described herein. The video can be orthorectified. In this example, a user requests an orthorectified overhead video to be displayed on a handheld computing device having a screen resolution of 1080p HD (e.g., 1920×1080 pixels). For purposes of this example, pixel depth is assumed to be 11 bits per pixel, a maximum frame rate is 30 frames per second, and video data is compressed using H.264 video compression which can achieve a compression ratio of about 50:1 for some video.

For this example, it is assumed that the video delivery system uses a nine tile per frame tiling scheme, as illustrated in FIGS. 3A and 3B. For each video frame, the video delivery system creates 9 evenly sized tiles to compose the frame. In FIGS. 3A and 3B, two tier segmentation is demonstrated, where FIG. 3A shows a first tier segmentation having 9 tiles numbered 1 through 9, and FIG. 3B shows a second tier segmentation of tile 5, wherein the second tier segmentation has 9 tiles numbered 5a through 5i. A greater number of tiers can be used in other examples such as 3, 4, 5, 6, 10, 16, or more tiers.

For this example, it is assumed that the user requesting the video data has a computing device with a maximum bandwidth of about 512 kbps. To stream the entire video frame over this connection, the bandwidth could support a maximum frame rate of about 1 FPS, consuming about 445.5 kbps of the network capacity. Therefore, to deliver the video stream the video delivery system can deliver nine first tier streams centered on a target of interest (i.e., the target of interest is located in tile 5). With the target of interest located in a single tile, the video delivery system can stream the corresponding tile stream (stream 5 in FIG. 3A) at 2 frames per second, while streaming the remaining streams at 1 frame per second. This represents an improvement over streaming the entire video frame as one stream. If the user were to zoom in on the video stream so that a single tile from the tier 1 segmentation occupies the entire screen, the single tile can be treated as a composite of nine second tier tiles, as illustrated in FIG. 3B. If the viewport were centered around the target of interest located in a single second tier stream (e.g., tile 5e), the video delivery system can transmit the data stream for tile 5e at 30 frames per second, while transmitting the surrounding second tier streams at 7 frames per second (fps). This represents a greater improvement over the initial single stream of the entire video frame while maintaining compliance with network throughput restrictions.

Through a user interface (e.g. accessible using a web browser on a computing device), the user can pan around the video to change which stream is the primary stream. As the user pans, some streams are dropped and new streams are delivered. Due at least in part to the time synchronization of the video streams, they can easily be dropped or added with little or no impact on the streams that are being displayed. As the computing device pans around the video, a given stream could switch from being a primary stream to being a secondary stream, resulting in a switch to a lower frame-rate stream.

TABLE 1

| Scale | Primary (fps) | Secondary (fps) | Width (Pixels) | Height (Pixels) | Data Rate (kbps) |
|---|---|---|---|---|---|
| Native | 1 | n/a | 1920 | 1080 | 445.5 |
| Tier 1 | 2 | 1 | 640 | 360 | 495 |
| Tier 2 | 30 | 7 | 213.333 | 120 | 473 |

Table 1 shows a summary of the performance characteristics discussed in the previous example. Table 2 shows the detailed calculations that led to these example performance characteristics.

TABLE 2

| Example Baseline Bandwidth Parameters/Native Video | | |
|---|---|---|
| Width | 1920 | pixels |
| Height | 1080 | pixels |
| Bit Depth | 11 | bits/pixel |
| Frame Rate | 30 | fps |
| Raw Data Rate | 668250 | kbps |
| Compression Ratio | 50 | |
| Final Data Rate | 13365 | kbps |
| Tier 1 | | |
| Tiles per Frame | 9 | |
| Primary Tile Frame Rate | 2 | fps |
| Primary Tile Data Rate | 99 | kbps |
| Supporting Tile Frame Rate | 1 | fps |
| Supporting Tile Data Rate | 49.5 | kbps |
| Tier 1 Data Rate | 495 | kbps |
| Tier 2 | | |
| Tiles per Frame | 9 | |
| Primary Tile Frame Rate | 30 | fps |
| Primary Tile Data Rate | 165 | kbps |
| Supporting Tile Frame Rate | 7 | fps |
| Supporting Tile Data Rate | 38.5 | kbps |
| Tier 2 Data Rate | 473 | kbps |

The data in Table 2 illustrates the effect on the total data rate of varying the frame rate for video tiles in a video stream. It also illustrates the effect on the total data rate of providing different resolutions. As described herein, the video data can comprise video streams that have differing frame rates, resolutions, bitrates, and the like to increase or maximize a quality of the video data of an ROI while providing video data to provide context to the video data of the ROI.

Example Method of Delivering Video Streams

Figure 4:
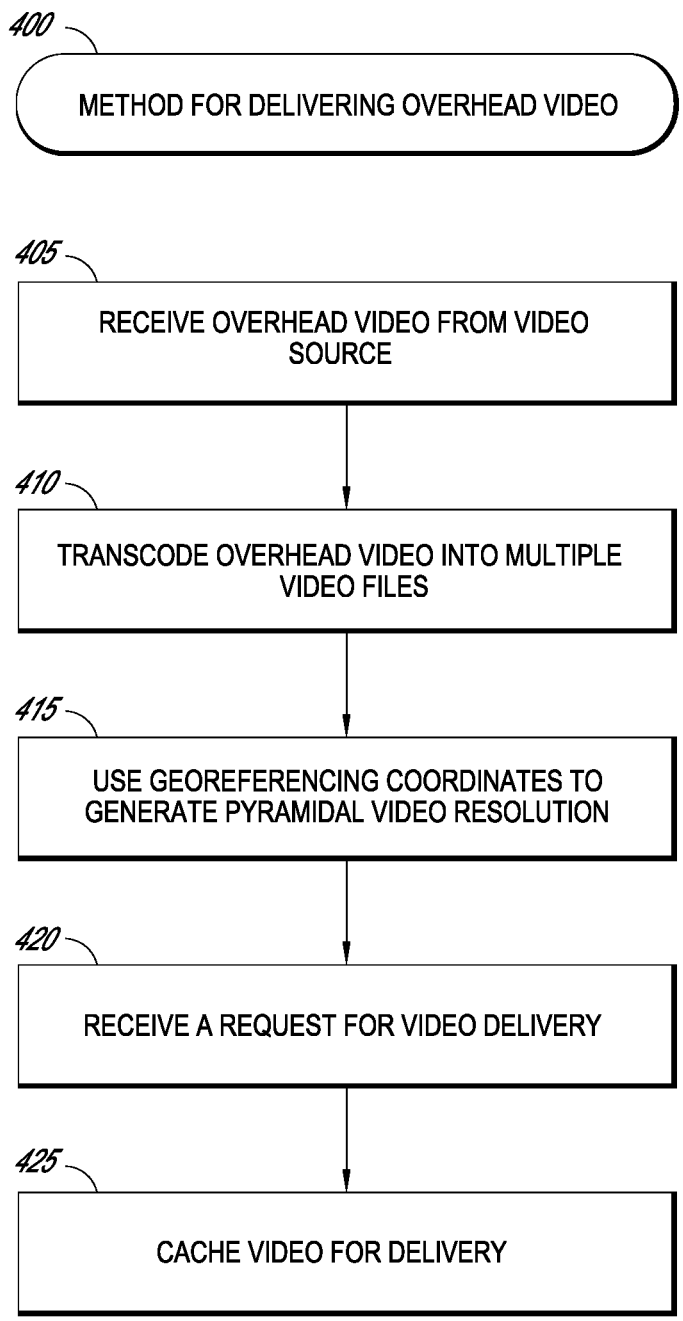
FIG. 4 illustrates a flowchart of an example method for delivering georeferenced video.

FIG. 4 illustrates a flowchart of an example method 400 for delivering overhead video to a computing device. For ease of description, the method 400 will be described as being performed by the video delivery system 100. However, the method 400 can be performed in whole or in part by any component of the video delivery system 100 or other similar system.

In block 405, the video delivery system 100 receives overhead video from a video source. The overhead video can include orthorectified video. The overhead video can include georeferenced video. The video delivery system 100 can receive the video data through a local network connection, a remote network connection, a cabled transfer, a wireless transfer of information, or through some other means of transferring the video data to the video delivery system 100. The video delivery system 100 can receive overhead video data that is not orthorectified and process the video data to make it orthorectified.

Figure 5:
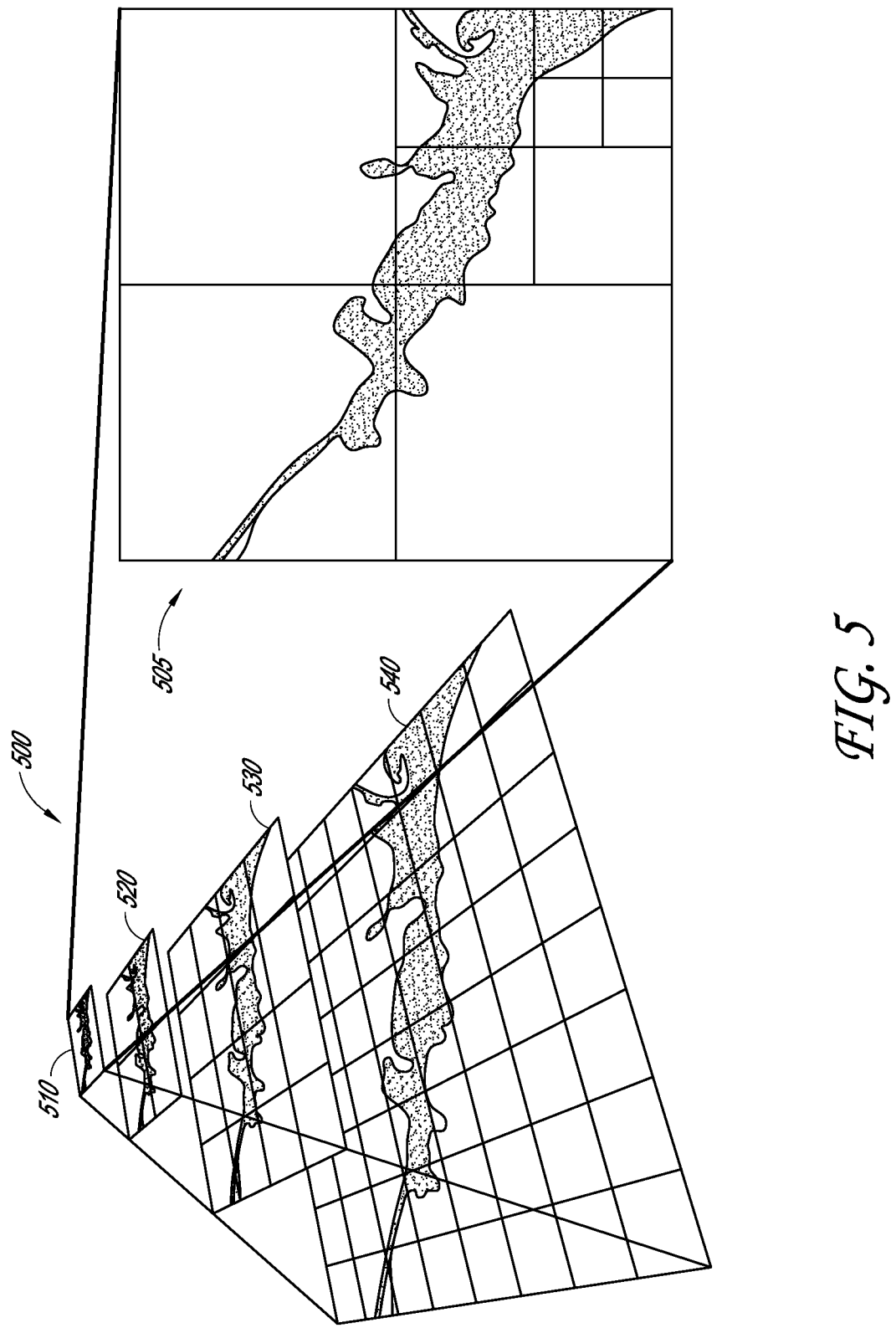
FIG. 5 illustrates an example of pyramid resolution segmented video data.

In block 410, the video delivery system 100 transcodes the overhead video into one or more video files. Transcoding the overhead video can include compressing the received video data using a video compression algorithm, such as H.264. Transcoding the overhead video can include segmenting the received video into tiles, as illustrated in FIGS. 3A and 3B. The video delivery system 100 can then employ video compression algorithms on the segmented tiles. This process can be iterated to create pyramid resolution segmented video data, as depicted in FIG. 5. Transcoding the received video data can include creating timing synchronization information for transcoded video frames. In some embodiments, the video delivery system 100 uses the timing synchronization information to create a synchronized video stream wherein the video stream comprises video frames having disparate resolutions, video frames from different video files, and/or wherein video frames are being displayed with different frame rates. In some embodiments, the video delivery system 100 delivers multiple video streams and selects the video streams to deliver based in part on the time synchronization information.

In block 415, the video delivery system 100 uses georeferencing coordinates to generate pyramidal video resolution. As described with reference to block 410, the video delivery system can transcode video frames and can create video frames with a pyramid resolution segmentation, as depicted in FIG. 5. For example, in the depiction in FIG. 5 a first layer 510 of the pyramid resolution segmentation 500 can include one tile which has a size and/or number of pixels that covers a geographic region 505. A second layer 520 can have four tiles, where each tile is approximately the same size or has the approximately the same number of pixels as the tile in the first layer 510 and where the four tiles cover the geographic region 505 (e.g., where approximately the same size or approximately the same number of pixels can mean that the number of pixels is within 10% of one another, within 5% of one another, within 1% of one another, or within 100 pixels of one another). Similarly, a third layer 530 has sixteen tiles covering the geographic region 505, each tile being approximately of a same size or number of pixels of the one tile in the first layer 510. A fourth layer 540 has sixty-four tiles covering the geographic region 505, each tile being approximately of a same size or number of pixels of the one tile in the first layer 510. This can progress to any number of layers, thereby creating the pyramid resolution segmentation which provides multiple resolutions for the geographic area 505. The number of layers and tiles in each layer can vary, and an increase in a number of tiles from one layer to a next layer can be any suitable progression (e.g., each successive layer can have 2× the number of tiles, 3× the number of tiles, 5× the number of tiles, 6× the number of tiles, 8× the number of tiles, etc.).

The video delivery system 100 can use georeferencing coordinates to store the transcoded video streams in a logically connected fashion. For example, the video delivery system 100 can include a database which stores information about the transcoded video streams. The database can include georeferencing coordinates for each transcoded video stream. In some embodiments, the video delivery system 100 uses the georeferencing coordinates from the database to generate video streams by stitching together proximal video streams to form a unified video stream. In some embodiments, the video delivery system 100 uses the georeferenceing coordinates from the database to identify and/or deliver proximal video streams to a requesting system. The georeferencing coordinates can aid in the creation of pyramidal resolution video streams that allow computing devices 110 to zoom in on video data, pan around the video data, and receive "foveated" video data. As used here, foveated video data includes video data which has at least one stream of a first quality and at least a second stream of a second quality, the second quality being less than the first quality. The quality of a video stream can be based at least in part on the frame rate, the bitrate, the resolution, and the like.

In block 420, the video delivery system 100 receives a request for video delivery. Receiving the request can comprise receiving a start time, end time, duration, ROI, georeferencing coordinates, network data rate, and the like from a computing device 110. The request for video delivery can be updated periodically based on computing device 110 requests or user actions. For example, if the computing device 110 pans the video data, the request for video delivery can be altered to include the new region being viewed. If the computing device 110 zooms in or out of the video, the request can be altered to include a different resolution and/or region according to the new viewing area. If the network bandwidth changes, the request can be updated to change resolutions and/or frame rates of tiles in the video stream to accommodate any increase or decrease in network data rate capacity.

Upon receiving the request, the video delivery system 100 can cache video for delivery. Caching video for delivery can include retrieving appropriate data streams as described herein. The video delivery system 100 can retrieve video data that is not part of the request but that is spatially proximal or proximal in resolution to the requested video to deliver video to the computing device 110 upon zooming or panning the video with little or no latency. Caching can include calculating appropriate resolutions and/or frame rates for delivering video data of interest such that a region of interest is presented having a desirable resolution and frame rate.

Example Method of Viewing Video Streams

In some embodiments, the video delivery systems and methods include design affordances for a viewer application (e.g., a graphical user interface (GUI)) on a computing device such as an ability to navigate a video sequence. The viewer application can provide a simple global time identifier to synchronize multiple video sequences to provide a substantially seamless video display (e.g., where substantially seamless can mean that an individual video frame from a displayed video tile is displayed within at least ±10 seconds from the global time identifier, at least ±1 seconds from the global time identifier, or at least ±0.5 seconds from the global time identifier). The video delivery system 100 may provide an application programming interface (API) to permit the viewer application (or other computing application) to interact with the system 100 to request and/or navigate video.

The video delivery system 100 can deliver a single video stream or multiple video streams. For example, a plurality of video streams can be delivered to the computing device 110 and displayed adjacently (e.g., with little or no overlap and/or little or no space between them) and time-synchronized to create the appearance of a single video stream. Geo-coordinates can be used to allow the computing device 110 to display the video via a map-like user interface (e.g., a web browser or other viewer) properly registered to a base map that includes the ROI. In other implementations, the system 100 can deliver the video stream(s) to a video player application which optionally can include a map-like interface or environment.

In some embodiments, systems and methods herein can be used to display georeferenced video imagery on a computing device 110. The computing device 110 can include a display having user interface elements allowing a user to interact with the video imagery. The user interface elements can include elements that allow a user to change a location or ROI being viewed (e.g., panning), change a zoom level or a resolution of a video stream (e.g., zoom in or out), and/or request foveated video imagery. For example, a user interface can include a tool (e.g., a representation of a magnifying glass or other icon) that allows a user to select a portion of the video imagery to be delivered at a different bitrate, spatial resolution, and/or frame rate. The user interface elements can include elements which display references to geographic coordinates and/or allow a user to update requested geographic coordinates. The user interface elements can include a time duration indicator which allows the user to change the time range being displayed.

Example Satellite Imaging System

FIG. 6 illustrates a representation of an example constellation 10 of imaging micro-satellites 12 in a low-earth orbit, a control system 14, a ground communication system 16, and an example of a target image area 18. Embodiments of the systems and methods described herein can be used to store and/or distribute images collected with the constellation 10. The collected images can include video, images, etc. In some implementations, the imaging satellites 12 can include an image acquisition system configured to acquire multi-spectral and/or pan-spectral images or videos of the target image area 18. The imaging satellites 12 can be owned and/or operated by a single entity or multiple entities. In various implementations, the constellation 10 may include 2, 4, 8, 10, 12, 16, 24, 30, or some other number of satellites. Although FIG. 6 shows an example constellation of micro-satellites 12, in other implementations the constellation 10 can include additional or different types of satellites including telecommunications satellites, mini-satellites, nano-satellites, and so forth.

The control system 14 or the ground communication system 16 can be configured to communicate with the video server system 100, described herein with reference to FIG. 1. For example, the control system 14 can receive video data from one, some, or all of the satellites 12 in the constellation 10 of satellites 12 through the ground communication system 16. The control system 14 can then transmit this data to the video server system 100, thereby acting as the video source 102 described with reference to FIG. 1. In some embodiments, the video server system 100 is in communication with the ground communication system 16, and the ground communication system 16 can act as the video source 102.

In some implementations, the constellation 10 of satellites can include any type of satellite including but not limited to satellites, mini-satellites, micro-satellites, nano-satellites, and so forth. Micro-satellite is a broad term and is to be given its ordinary and customary meaning to a person of ordinary skill in the art (e.g., it is not to be limited to a special or customized meaning), and includes, without limitation, satellites with a mass less than or equal to about 500 kg and/or physical dimensions less than or equal to about 125 cm×125 cm×175 cm, or satellites that launch as a secondary payload on a launch vehicle. According to some conventions, satellites having a mass less than or equal to about 500 kg are classified as small satellites with further divisions being made based on their mass. For example, in one classification system, small satellites are deemed mini-satellites when they have a mass between about 100 kg and 500 kg, micro-satellites when they have a mass between about 10 kg and 100 kg, nano-satellites when they have a mass between about 1 kg and 10 kg, pico-satellites when they have a mass between about 0.1 kg and 1 kg, and femto-satellites when they have a mass less than or equal to about 100 g. However, any reference to micro-satellite, mini-satellite, or small satellite in this disclosure should be understood to mean the general class of satellites having a mass less than or equal to about 500 kg and/or physical dimensions less than or equal to about 125 cm×125 cm×175 cm; and not to the more specific classification of satellites identified herein or other similar classification schemes. As used in this paragraph, about can mean ±10%, ±5%, or ±1%.

Additional Examples and Embodiments

In embodiment 1, a method is provided for delivering overhead video to a computing device. The method includes, under control of an overhead video delivery system comprising computing hardware, receiving overhead video from an overhead imaging platform; generating a first version of the overhead video having a first resolution; generating a second version of the overhead video having a second resolution, the second resolution being less than the first resolution; creating first georeferenced video data and second georeferenced video data by incorporating georeferencing coordinates and time synchronization information into the first version of the overhead video data and the second version of the overhead video data, respectively; storing the first georeferenced video data and the second georeferenced video data in one or more transcoded video files; and transmitting to the computing device a primary video stream comprising the first georeferenced video data and a secondary video stream comprising the second georeferenced video data. The primary video stream includes images of a geographical region and the second video stream includes images of a proximal geographical region.

The method of embodiment 2 includes all the elements of embodiment 1, and wherein transmitting to the computing device is accomplished using less than or equal to about 512 kilobits per second (kbps) of bandwidth over a network connection. The method of embodiment 3 includes all the elements of embodiment 1, and wherein the primary video stream comprises a transcoded video file with a data rate that is less than or equal to 100 kilobits per second (kbps). The method of embodiment 2 includes all the elements of embodiment 3, wherein the secondary video stream comprises a transcoded video file with a data rate that is less than or equal to 50 kilobits per second (kbps). The method of embodiment 5 includes all the elements of embodiment 1, wherein the secondary video stream comprises at least 8 transcoded video files comprising imagery adjacent to the imagery of the geographical region in the primary video stream. The method of embodiment 6 includes all the elements of embodiment 1, wherein the first resolution is at least about 1920 pixels by 1080 pixels. The method of embodiment 7 includes all the elements of embodiment 6, wherein the second resolution is at least about 640 pixels by 360 pixels. The method of embodiment 8 includes all the elements of embodiment 1, wherein a ratio of the second resolution to the first resolution is less than or equal to ½. The method of embodiment 9 includes all the elements of embodiment 8, wherein the ratio is less than ⅓. The method of embodiment 10 includes all the elements of embodiment 1, wherein the overhead video comprises orthorectified overhead video. The method of embodiment 11 includes all the elements of embodiment 1, wherein the overhead imaging platform comprises an imaging satellite.

In embodiment 12, a system is provided for delivering overhead video to a computing device. The system includes non-transitory data storage configured to store overhead video and computing hardware in communication with the non-transitory data storage. The computing device is configured with instructions to execute a transcoding module configured to generate a transcoded video from the overhead video, the transcoded video having a multi-scale, pyramidal data format and including georeferencing coordinates and time synchronization information; a rendered video storage module configured to store the transcoded video in one or more transcoded video files on the non-transitory data storage; and a caching module configured to respond to requests for overhead video data from the computing device by retrieving a primary video stream comprising transcoded video files for a geographical region, caching a secondary video stream comprising transcoded video files from geographical regions proximal to the geographical region, and transmitting to the computing device the primary video stream and at least one of the cached transcoded video files of the secondary video stream.

The system of embodiment 13 includes all the elements of embodiment 12, wherein a resolution of the cached transcoded video files of the secondary video stream is less than a resolution of the transcoded video files of the primary video stream. The system of embodiment 14 includes all the elements of embodiment 12, wherein a frame rate of the cached transcoded video files of the secondary video stream is less than a frame rate of the transcoded video files of the primary video stream. The system of embodiment 15 includes all the elements of embodiment 12, wherein an image compression ratio of the cached transcoded video files of the secondary video stream is greater than an image compression ratio of the transcoded video files of the primary video stream. The system of embodiment 15 includes all the elements of embodiment 12, wherein the cached transcoded video files of the secondary video stream comprises overhead video of regions adjacent to the geographical region. The system of embodiment 17 includes all the elements of embodiment 12, wherein the transcoding module is further configured to generate a resolution pyramid for the overhead video data. The system of embodiment 18 includes all the elements of embodiment 12, wherein the caching module is further configured to drop one or more frames from the cached transcoded video files while maintaining synchronization of the primary video stream and the secondary video stream through the time synchronization information.

In embodiment 19, a non-transitory computer storage configured with executable instructions for delivering overhead video data is provided. The executable instructions include a transcoding module configured to transcode overhead video into multiple video streams and to encode the multiple video streams with georeferencing coordinates and time synchronization information; a caching module configured to retrieve a primary video stream comprising a video stream that includes overhead video of a geographical region and to retrieve a plurality of secondary video streams comprising video streams that include imagery of geographical regions adjacent to the geographical region; and a transmission module configured to send the primary video stream and the plurality of secondary video streams over a network to a receiving computing device. The primary video stream has a frame rate that is greater than a frame rate of each of the plurality of secondary video streams.

The non-transitory computer storage of embodiment 20 includes all the elements of embodiment 19, wherein a bitrate of the primary video stream is greater than a bitrate of each of the plurality of secondary video streams. The non-transitory computer storage of embodiment 21 includes all the elements of embodiment 19, wherein a resolution of the primary video stream is greater than a resolution of each of the plurality of secondary video streams. The non-transitory computer storage of embodiment 22 includes all the elements of embodiment 19, wherein the caching module is further configured to retrieve at least one different secondary video stream during transmission of the primary video stream and the plurality of secondary video streams; and send to the receiving computing device over the network the at least one different secondary video stream. The transmission module is configured to utilize the time synchronization information to send the at least one different secondary video stream synchronized in time with the primary video stream. The non-transitory computer storage of embodiment 23 includes all the elements of embodiment 19, wherein the caching module is further configured to select the primary video stream and the plurality of secondary video streams such that a data rate transmitted over the network is less than a bandwidth of the receiving computing device In embodiment 24, a system for delivering overhead video to a requesting computing device is provided. The system includes a transcoding module configured to transcode overhead video into a multi-scale, pyramidal data format and to encode the overhead video data with georeferencing coordinates and time synchronization information, a rendered video storage module configured to store the transcoded video in one or more transcoded video files, and a caching module configured to respond to requests from the requesting computing device for overhead video data. The caching module can be configured to respond by: retrieving transcoded video files for a geographical region, selecting appropriate transcoded video files within the geographical region, caching the selected transcoded video files from proximal geographical regions, and serving to the requesting computing device one or more of the cached video files.

In embodiment 25, a method for delivering overhead video to a requesting computing device is provided. The method can be performed under control of an overhead video delivery system comprising physical computer hardware. The method includes transcoding overhead video into a multi-scale, pyramidal data format, encoding the overhead video data with georeferencing coordinates and time synchronization information to provide georeferenced video data, storing the georeferenced video data in one or more transcoded video files, and responding to requests from the requesting computing device for overhead video data. In responding to the requests, the method can include retrieving one or more transcoded video files for a geographical region, selecting appropriate transcoded video files within the geographical region, caching the selected transcoded video files from proximal geographical regions, and serving to the requesting computing device one or more of the cached video files.

In embodiments 24 and 25, the one or more cached video files may comprise segmented videos that have differing resolutions, image compression, and/or frame rates. In embodiments 24 and 25, the overhead video can include orthorectified overhead video.

CONCLUSION

Examples of video delivery systems and associated components and methods have been described with reference to the figures. The figures show various systems and modules and connections between them. The various modules and systems can be combined in various configurations and connections between the various modules and systems can represent physical or logical links. The representations in the figures have been presented to clearly illustrate the principles of managing overhead video and delivering the video over a network, and details regarding divisions of modules or systems have been provided for ease of description rather than attempting to delineate separate physical embodiments. The examples and figures are intended to illustrate and not to limit the scope of the inventions described herein. For example, the principles disclosed herein may be applied to systems that deliver any type of video data whether or not it is orthorectified or whether it is georeferenced or not.

Although certain preferred embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein. Further, although example data and tables are provided herein, the data and tables are intended to illustrate examples of the disclosure and are not intended to be limiting. Also, ranges of numerical values within the data and tables include all values between endpoints of the ranges.

Each of the processes, methods, and algorithms described herein and/or depicted in the attached figures (including FIG. 4) may be embodied in, and fully or partially automated by, code modules executed by one or more physical computing systems, computer processors, application-specific circuitry, and/or electronic hardware configured to execute computer instructions. For example, computing systems and devices can include general or special purpose computers, servers, desktop computers, laptop or notebook computers or tablets, personal mobile computing devices, mobile telephones, and so forth. A code module may be compiled and linked into an executable program, installed in a dynamic link library, or may be written in an interpreted programming language.

Various embodiments have been described in terms of the functionality of such embodiments in view of the general interchangeability of hardware and software. Whether such functionality is implemented in application-specific hardware or circuitry or in software executing on one or more physical computing devices depends upon the particular application and design constraints imposed on the overall system. Further, certain implementations of the functionality of the present disclosure are sufficiently mathematically, computationally, or technically complex that application-specific hardware or one or more physical computing devices (utilizing appropriate executable instructions) may be necessary to perform the functionality, for example, due to the volume or complexity of the calculations involved or to provide results substantially in real-time.

Code modules may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes and process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer or software product or packaged into multiple computer or software products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network (e.g., a terrestrial and/or satellite network) or any other type of communication network.

The various elements, features and processes described herein may be used independently of one another, or may be combined in various ways. All possible combinations and sub-combinations are intended to fall within the scope of this disclosure. Further, nothing in the foregoing description is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The foregoing disclosure, for purpose of explanation, has been described with reference to specific embodiments, applications, and use cases. However, the illustrative discussions herein are not intended to be exhaustive or to limit the inventions to the precise forms disclosed. Many modifications and variations are possible in view of the above teachings. The embodiments were chosen and described in order to explain the principles of the inventions and their practical applications, to thereby enable others skilled in the art to utilize the inventions and various embodiments with various modifications as are suited to the particular use contemplated.

What is claimed is:

1. A method for delivering overhead video to a computing device, the method comprising:
   under control of an overhead video delivery system comprising computing hardware:
   receiving overhead video from an overhead imaging platform;
   generating a first version of the overhead video having a first resolution;
   generating a second version of the overhead video having a second resolution, the second resolution being less than the first resolution;
   creating first georeferenced video data and second georeferenced video data by incorporating georeferencing coordinates and time synchronization information into the first version of the overhead video data and the second version of the overhead video data, respectively;
   storing the first georeferenced video data and the second georeferenced video data in one or more transcoded video files; and
   transmitting to the computing device a primary video stream comprising the first georeferenced video data and a secondary video stream comprising the second georeferenced video data,
   wherein the primary video stream includes images of a geographical region and the secondary video stream includes images of a proximal geographical region.

2. The method of claim 1, wherein transmitting to the computing device is accomplished using less than or equal to about 512 kilobits per second (kbps) of bandwidth over a network connection.

3. The method of claim 1, wherein the primary video stream comprises a transcoded video file with a data rate that is less than or equal to 100 kilobits per second (kbps).

4. The method of claim 3, wherein the secondary video stream comprises a transcoded video file with a data rate that is less than or equal to 50 kilobits per second (kbps).

5. The method of claim 1, wherein the secondary video stream comprises at least 8 transcoded video files comprising imagery adjacent to the imagery of the geographical region in the primary video stream.

6. The method of claim 1, wherein the first resolution is at least about 1920 pixels by 1080 pixels.

7. The method of claim 6, wherein the second resolution is at least about 640 pixels by 360 pixels.

8. The method of claim 1, wherein a ratio of the second resolution to the first resolution is less than or equal to ½.

9. The method of claim 8, wherein the ratio is less than ⅓.

10. The method of claim 1, wherein the overhead video comprises orthorectified overhead video.

11. The method of claim 1, wherein the overhead imaging platform comprises an imaging satellite.

12. A system for delivering overhead video to a computing device, the system comprising:
   non-transitory data storage configured to store overhead video;
   computing hardware in communication with the non-transitory data storage, the computing device configured with instructions to execute:
   a transcoding module configured to generate a transcoded video from the overhead video, the transcoded video having a multi-scale, pyramidal data format and including georeferencing coordinates and time synchronization information;
   a rendered video storage module configured to store the transcoded video in one or more transcoded video files on the non-transitory data storage; and a caching module configured to respond to requests for overhead video data from the computing device by:
retrieving a primary video stream comprising transcoded video files for a geographical region;
caching a secondary video stream comprising transcoded video files from geographical regions proximal to the geographical region; and
transmitting to the computing device the primary video stream and at least one of the cached transcoded video files of the secondary video stream.

13. The system of claim 12, wherein a resolution of the cached transcoded video files of the secondary video stream is less than a resolution of the transcoded video files of the primary video stream.

14. The system of claim 12, wherein a frame rate of the cached transcoded video files of the secondary video stream is less than a frame rate of the transcoded video files of the primary video stream.

15. The system of claim 12, wherein an image compression ratio of the cached transcoded video files of the secondary video stream is greater than an image compression ratio of the transcoded video files of the primary video stream.

16. The system of claim 12, wherein the cached transcoded video files of the secondary video stream comprises overhead video of regions adjacent to the geographical region.

17. The system of claim 12, wherein the transcoding module is further configured to generate a resolution pyramid for the overhead video data.

18. The system of claim 12, wherein the caching module is further configured to drop one or more frames from the cached transcoded video files while maintaining synchronization of the primary video stream and the secondary video stream through the time synchronization information.

19. Non-transitory computer storage configured with executable instructions for delivering overhead video data, the executable instructions comprising:
a transcoding module configured to transcode overhead video into multiple video streams and to encode the multiple video streams with georeferencing coordinates and time synchronization information;
a caching module configured to retrieve a primary video stream comprising a video stream that includes overhead video of a geographical region and to retrieve a plurality of secondary video streams comprising video streams that include imagery of geographical regions adjacent to the geographical region; and
a transmission module configured to send the primary video stream and the plurality of secondary video streams over a network to a receiving computing device,
wherein the primary video stream has a frame rate that is greater than a frame rate of each of the plurality of secondary video streams.

20. The non-transitory computer storage of claim 19, wherein a bitrate of the primary video stream is greater than a bitrate of each of the plurality of secondary video streams.

21. The non-transitory computer storage of claim 19, wherein a resolution of the primary video stream is greater than a resolution of each of the plurality of secondary video streams.

22. The non-transitory computer storage of claim 19, wherein the caching module is further configured to:
retrieve at least one different secondary video stream during transmission of the primary video stream and the plurality of secondary video streams; and
send to the receiving computing device over the network the at least one different secondary video stream,
wherein the transmission module is configured to utilize the time synchronization information to send the at least one different secondary video stream synchronized in time with the primary video stream.

23. The non-transitory computer storage of claim 19, wherein the caching module is further configured to select the primary video stream and the plurality of secondary video streams such that a data rate transmitted over the network is less than a bandwidth of the receiving computing device.

* * * * *